United States Patent [19]

Mooney

[11] Patent Number: 4,659,062

[45] Date of Patent: Apr. 21, 1987

[54] FLOWGRID REGULATOR

[76] Inventor: Richard J. Mooney, 2552 Neffs La., Salt Lake City, Utah 84109

[21] Appl. No.: 593,281

[22] Filed: Mar. 26, 1984

[51] Int. Cl.$^4$ .............................................. F16K 7/17
[52] U.S. Cl. .................... 251/61.1; 251/118; 251/331; 251/337; 137/625.33; 137/489; 267/43
[58] Field of Search ........................ 251/61.1, 118, 331, 251/337; 137/625.3, 625.33, 599, 489, 529; 267/42, 43; 92/94, 95

[56] References Cited

U.S. PATENT DOCUMENTS

| | | | |
|---|---|---|---|
| 208,992 | 10/1878 | Silva | 92/94 |
| 344,216 | 6/1886 | Storm | 267/43 |
| 848,739 | 2/1907 | Gut | 251/46 |
| 1,171,585 | 2/1916 | Brewster | 267/43 |
| 1,269,721 | 6/1918 | Kuntny | 137/93 |
| 1,281,445 | 10/1918 | Weaver | 267/42 |
| 1,496,935 | 6/1924 | Lemmon | 251/119 |
| 1,793,396 | 2/1931 | Haentjens | 251/24 |
| 2,070,659 | 2/1937 | Higham | 137/529 |
| 2,407,761 | 9/1946 | McPherson | 251/30 X |
| 2,615,471 | 10/1952 | McFarland | 251/331 |
| 2,632,621 | 3/1953 | Gamble | 92/94 X |
| 2,877,791 | 3/1959 | Rich | 137/625.33 X |
| 2,912,997 | 11/1959 | Griswold | 137/456 |
| 3,092,144 | 6/1963 | Green | 137/625.3 |
| 3,140,947 | 12/1938 | Andersson et al. | 92/94 X |
| 3,217,736 | 11/1965 | Voss | 137/529 X |
| 3,310,282 | 3/1967 | Boteler | 251/331 |
| 3,357,443 | 12/1967 | Brumm | 137/116.5 |
| 3,623,700 | 11/1971 | Boteler | 251/331 |
| 3,669,143 | 6/1972 | Reese | 137/489 X |
| 3,727,623 | 4/1973 | Robbins | 251/14 X |
| 3,792,720 | 2/1974 | Robbins | 251/14 X |
| 3,856,046 | 12/1974 | Brown et al. | 251/61.1 |
| 4,014,514 | 3/1977 | Priese et al. | 251/331 |
| 4,105,186 | 8/1978 | Eby | 251/35 |
| 4,181,151 | 1/1980 | Ensign | 251/61.1 X |
| 4,214,604 | 7/1980 | Rumsey | 251/331 |
| 4,327,891 | 5/1982 | Allen et al. | 251/61.1 |

FOREIGN PATENT DOCUMENTS

| | | | |
|---|---|---|---|
| 195200 | 5/1958 | Austria | 251/331 |
| 622495 | 6/1961 | Canada | 251/331 |
| 1254969 | 11/1967 | Fed. Rep. of Germany | 251/61.1 |
| 2414381 | 8/1974 | Fed. Rep. of Germany | 251/331 |
| 1069099 | 7/1954 | France | 137/625.33 |
| 7514590 | 6/1977 | Netherlands | 137/625.33 |
| 4175 | of 1873 | United Kingdom | 137/529 |
| 696545 | 9/1953 | United Kingdom | 251/331 |
| 842019 | 7/1960 | United Kingdom | 251/331 |
| 857452 | 12/1960 | United Kingdom | 251/331 |

OTHER PUBLICATIONS

Fisher Controls, "Type 282 Relief Valve", Bulletin 71.4:282, May 1972.
Fisher Controls, "Instruction Mannual and Parts List, Type 282 Dia-Grid", Fisher Controls Co., 1-17; pp. 1-8.
Singer, American Meter Division, "Axial Flow Valve", Bulletin 145 J, 11-71.
Grove Valve and Regulator Co., "Flexflo", Bulletin No. 800-R-11, 5-83.

Primary Examiner—Samuel Scott
Assistant Examiner—Carl D. Price
Attorney, Agent, or Firm—M. Reid Russell

[57] ABSTRACT

A flowgrid regulator for use as a flow control device in conjunction with a pilot system. The invention includes a valve body, containing a flow barrier, that connects to a spring casing with a throttling plate, spacer and diaphram sandwiched therebetween. The throttling plate intersects the barrier and includes openings on either side of the barrier intersection for passing a flow under pressure therethrough. The diaphram is constructed of a non stretchable flexible material and is maintained to move vertically above the throttling plate to position a throttling element bonded thereto into covering engagement with the throttling plate openings. The diaphram position is controlled by a combination of spring force and pressure differential as supplied by the pilot system connection thereto to urge the throttling element against the throttling plate openings thereby controlling flow area and flow rate.

10 Claims, 12 Drawing Figures

U.S. Patent   Apr. 21, 1987   Sheet 1 of 2   4,659,062
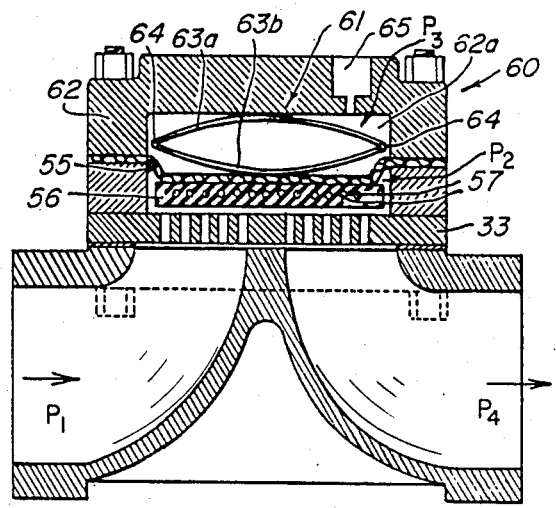
FIG. 9.
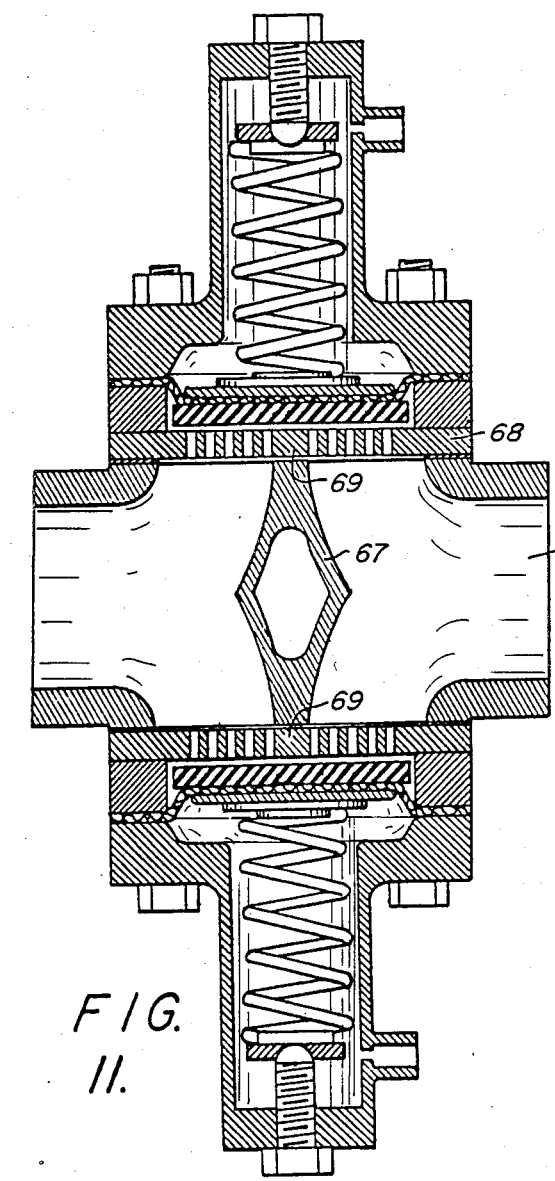
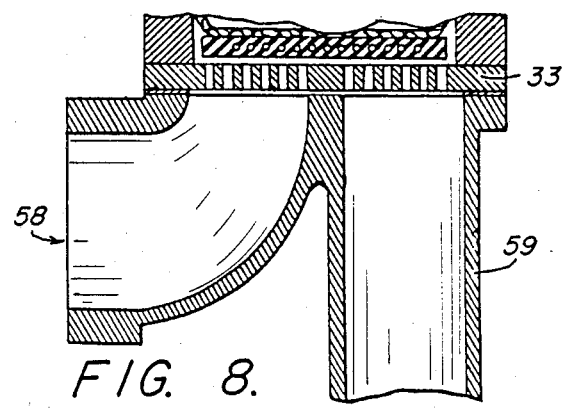
FIG. 8.
FIG. 11.
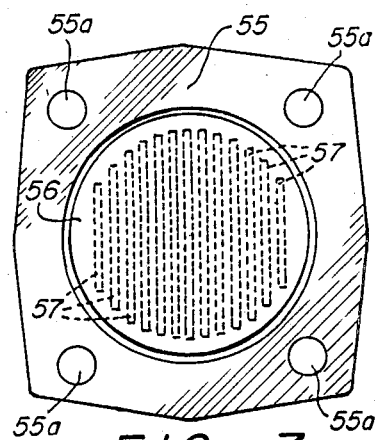
FIG. 7.
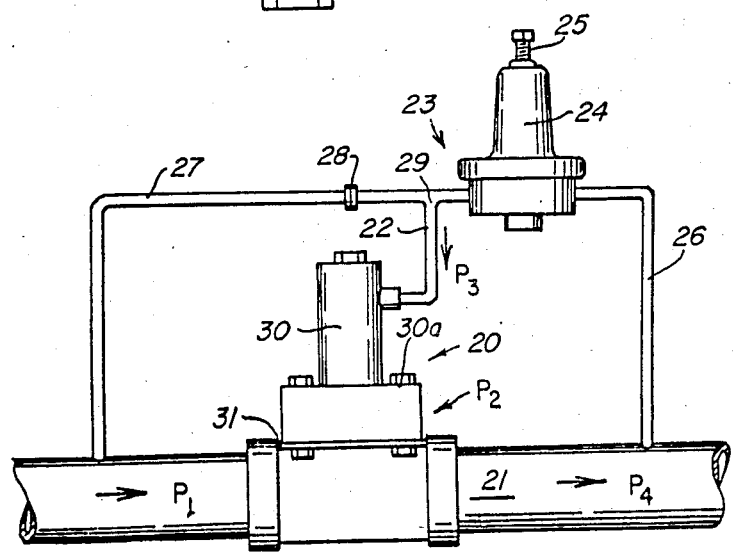
FIG. 1.
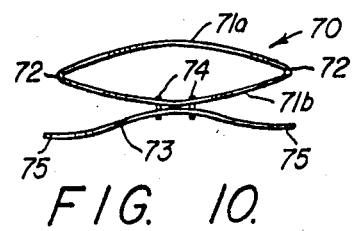
FIG. 10.

FLOWGRID REGULATOR

BACKGROUND OF THE INVENTION

1. Field of the Invention

This invention relates generally to diaphram valves for controlling flow of various fluids.

2. Prior Art

Previous designs of control devices operated by a pressure differential have generally involved mechanisms that include a rubber or elstomeric diaphragm that is stretched to open, relying, at least in part, on the tensile strength of the elastomer in conjunction with a pressure differential to return the valve to the closed position. Examples of several of these types of valves are shown in patents by: Rich, U.S. Pat. No. 2,877,971; Bryant, U.S. Pat. No. 2,353,143; and Davis, U.S. Pat. No. 2,677,930. Such reliance on elastomer tensile strength has certain inherent design deficiencies that the present invention, by utilizing a flexing diaphragm with fabric reinforcement to provide high tensile strength rather than a stretching, purely elastomer diaphragm, improves upon. These deficiencies are: (1) diaphragm travel or degree of opening is limited by the tensile strength of the elastomer material; (2) diaphragm tensile strength and stretching characteristics are adversely affected by temperature from ambient and fluid expansion that are associated with pressure reduction; (3) diaphragm travel (valve opening) must be limited to avoid instability, fluttering, or chattering, resulting in a need for large throttling area to achieve acceptable capacity; (4) the diaphragm must be fairly thick to provide durability and strength for a throttling operation and to avoid wear failure due to the presence of abrasive materials in the fluid stream, which durability requirements results in the need for greater minimum pressure differential to open such diaphragm valve; (5) the tendency of the elastomer material to "take a set", failing to return to its original shape, increases with elastomer thickness resulting in a sluggish operation at lower temperatures. In summary, it is difficult to design an elastomer diaphragm that will meet the conflicting requirements of durability, stretchability, stability, and acceptable minimum pressure differential for opening.

Where flow control devices have not utilized a stretchable diaphragm element such have taught other closure arrangements. For example, patents by: Randall, et al., U.S. Pat. No. 3,020,925; Spence, U.S. Pat. No. 2,860,657; Zadoo, U.S. Pat. No. 3,792,713; and Johnson, et al., U.S. Pat. No. 3,064,675, show valves that involve an orifice and valve plug arrangement connected to a diaphram and are closed, generally, by a spring arrangement.

Unlike earlier devices, the present invention is directed towards a regulator that utilizes a molded fabric reinforced elastomeric diaphragm with high tensile strength that is flexible but does not stretch, and so does not suffer from the inherent problems of such stretchable diaphrams, but is functionally similar thereto.

SUMMARY OF THE INVENTION

It is a primary objective of this invention to provide a flexible diaphragm valve that includes a flexing diaphram bonded to a flexible throttling element as a flow control device that is capable of providing consistant operation at high and low pressure differentials, varying temperatures, and is not dependent on the tensile strength of the base elastomer used.

It is another object to provide a flexing diaphram valve for controlling flow that is constructed from a molded fabric reinforced elastomeric material to provide a diaphragm with very high tensile strength that is flexible but will not stretch.

It is another object to provide a flow control device where a minimum pressure differential required for operation is controlled by a selection of a spring biasing for acting upon the flexing diaphragm.

It is another object to provide a flow control device that can be used to manipulate flow to control pressure (upstream or downstream), temperature, level, or the like by selection of an appropriate pilot system.

It is another object to provide a diaphragm operated flow control device with a main throttling element constructed to resist "taking a set" and will respond quickly to a pressure change input from a pilot system.

It is another object to provide a flowgrid regulator whose flow capacity and characteristics can be varied by a selection and installation of a flow area having a particular shape and area.

It is another object to provide a flexing diaphragm operated flow control device that has few parts and can be manufactured at low cost.

It is another object to provide a flow control device that may be easily disassembled in the field for maintenance and cleaning without requiring removal of a valve body portion thereof from the pipeline.

It is another object to provide a regulator device that can incorporate multiple diaphragm throttling elements on a single valve body to provide more capacity or to provide backup in case of a failure.

It is another object to provide a diphram flow control device that can be used with liquids and compressible gases.

It is another object to provide a flow control device that is bi-directional in flow.

It is another object to provide a diaphram flow control device that has wide rangeability from maximum to minimum flow and avoids fluttering, chattering, surging, and instability.

It is another object to provide a flow control device that utilizes a two stage pressure drop for quiet operation and to minimize liquid cavitation at high pressure drops.

In accordance with the above objects, the present invention is in a flowgrid regulator for use in conjunction with a pilot system. The flowgrid regulator includes a housing having a valve body portion for connection between inlet and outlet flow passages, the valve body including a barrier separating the flows. The housing is arranged to be broken to separate a spring casing or loading chamber from the valve body above the barrier and provides for fixing in place a throttling plate whose openings or passages therethrough are on either side of a solid area that seals against the barrier. The throttling plate is selected to provide a flow area of a desired shape and open area for a certain capacity or type of flow across that barrier. Above the throttling plate, suspended between a spring casing base and a spacer, to lie across that throttling plate, separating the valve body from an open cavity, is a diaphram. The diaphram is preferably constructed from a fabric reinforced elastomer that is flexible and is reinforced to have a high tensile strength and will not stretch. The diaphram has attached, preferably in the fabrication process a somewhat elastic throttling element, supported across, in covering attitude, to the throttling plate. The fabric reinforced diaphram allows for vertical travel of the throttling element whereby, in response to a pressure differential that is provided by a pilot system, taking into account a loaded spring action against diaphram vertical travel, the throttling element will lift or "peel" off the throttling plate, allowing a flow to pass through the throttling plate responsive to the pressure differential.

The preferred throttling element is formed during diaphram fabrication where the diaphram material is coated with a relatively soft elastomer that elastomer flowing into a mold of the throttling element that, when cured, is integral thereto, and may be reinforced with lateral ribs implanted therein that extend parallel to one another and across the direction of flow through the flowgrid regulator. The throttling element will lift off the throttling plate when a greater pressure exists on the undersurface thereof than is present in the spring casing in combination with the force exerted by a loaded spring arrangement, the throttling element tending to peel off from the throttling plate, the ribs, when present, reinforcing the elastomer to prevent damage at high pressure differentials.

The diaphram is spring loaded to clamp the throttling element into closing engagement over the throttling plate openings. The spring is preloaded and that load is distributed to exert the biasing force on the diaphram and throttling element, which force augments the force resulting from the pressure differential developed by the pilot system connected thereto. The pilot system provides a pressure within that spring casing or loading chamber that is related to the flow required.

BRIEF DESCRIPTION OF THE DRAWINGS

These and other objects will appear from the following detailed description in which the preferred embodiments have been described in detail in conjunction with the accompanying drawings.

FIG. 1 is a side elevation view of the flowgrid regulator of the present invention connected to a pilot system as it would be arranged to function as a pressure reducing regulator;

FIG. 7 is a top plan view of the throttling element portion of the diaphram member removed from the flowgrid regulator of FIG. 3 showing, in broken lines, a number of spaced apart parallel ribs implanted in the throttling element;

FIG. 8 is an angle body version of the lower housing portion shown broken away from the spring casing of the flowgrid regulator;

FIG. 9 is another embodiment of the flowgrid regulator shown as including, within a spring casing, a loaded elliptical spring for providing biasing to the diaphram member;

FIG. 10 is a side elevation view of another embodiment of an elliptical spring; and FIG. 11 is a side elevation sectional view like that of FIG. 3 except showing an arrangement of dual flowgrid regulators of the present invention that utilize a single valve body.

DETAILED DESCRIPTION

Figure 3:
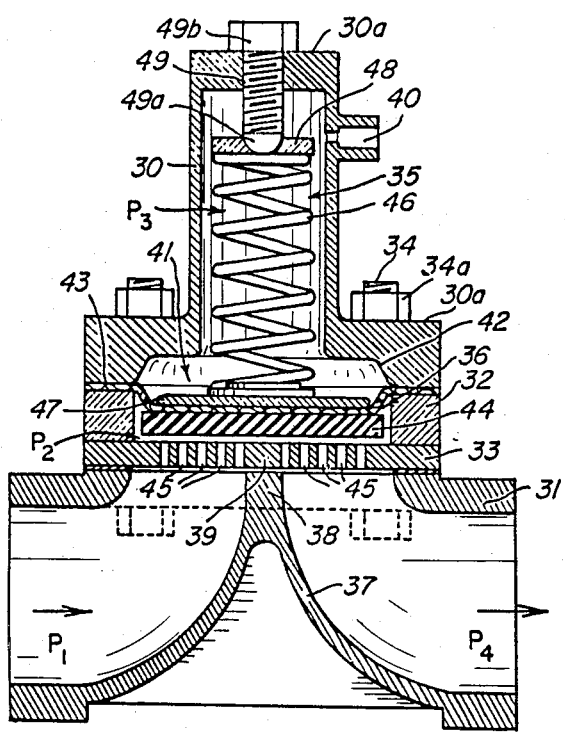
FIG. 3 is a side elevation sectional view taken along the line 3—3 of FIG. 2 showing the flowgrid regulator interior, as including a valve body wherein is arranged a barrier separated from a spring casing by a juxtapositioned throttling plate and diaphram member with a throttling element.

Referring now to the drawings:

FIG. 1 shows a systematic view of a flowgrid regulator 20 of the present invention installed in line 21 wherethrough a fluid under pressure, usually a gas is flowing. The flowgrid regulator is interposed therein to control that flow. In this arrangement the flowgrid regulator will function as a pressure reducing valve, opening to increase flow when the downstream pressure falls below the set point of a pilot regulator 24. The flowgrid regulator may be operated singly, or as illustrated in the embodiment of FIG. 11, can be arranged to function with another like device providing a greater flow than is possible with one flowgrid, or can be used as a back up with dual or duplicate pilot control systems.

In FIG. 1 the flowgrid regulator 20 is shown arranged in line 21 that connects also through line 22 to a pilot system 23. The pilot system includes the pilot regulator 24 that is a simple self-operating pressure regulator, and constitutes a variable orifice whose opening and closing is governed by the pressure available through line 26. In practice, a pilot sold by Fisher Controls identified as type 67 has been found to operate satisfactorily as the pilot regulator in the pilot system. Such a pilot regulator 24 is adjustable, as illustrated by screw 25, for setting a desired presure, whereby the pilot regulator opening is controlled by a reduction in pressure below the set pressure through a line 26 that connects the pilot to the downstream system through line 21. Line 27 intersects the upstream line 21, and supplies pressure to the pilot regulator 24 through a fixed orifice 28, and at a T connector 29 that connects through line 22, to the flowgrid regulator.

The flowgrid regulator 20 of the present invention provides for opening in response to a pressure differential across the diaphram and thottling element labeled as shown in FIG. 1, $P_2$ and $P_3$ respectively. For a pressure reducing control application with the described pilot system 23, that should be taken as typical, the flow is manipulated to maintain precise control of pressure in the outlet or downstream system $P_4$. The pilot regulator 24, a simple self operated pressure regulator, responds to change in the pressure $P_4$ by varying the opening of a valve therein, functioning as a variable orifice. The pilot regulator, in conjunction with fixed orifice 28, which is smaller than the variable orifice 24, forms a pneumatic or hydraulic fluid amplifier that is the pilot system 23 and is responsive to a process variable such as pressure, temperature, fluid level, and the like. The variable orifice can be constructed to respond to pressure changes as show or to changes in flow, temperature, level, or on/off signals to control the action of the flowgrid regulator in response to those variables. Flowgrid regulator operation is controlled through the pilot system 23, connected as described, to provide a pressure $P_3$ into a spring casing 30 that is located above a valve or throttling element 44 therein that opens in response to pressure differential ($P_2-P_3$).

In practice, as the pilot 24 opens responsive to a decrease in pressure $P_4$ flow increases through the fixed orifice 28. As flow increases through that fixed orifice the resulting pressure drop is conducted through line 22 to spring casing chamber 35 and loading pressure $P_3$ within the spring casing assumes some value between $P_1$ and $P_4$. Within the flowgrid regulator, as illustrated in FIG. 3 and as will be explained in detail later herein, an interstage pressure $P_3$ is present at a throttling plate 33, with the pressures $P_2$ and $P_3$ separated by a diaphram 43 that is preferably a molded fabric reinforced elastomeric material whereto is secured a throttling element 44 that is also preferably formed in the molding process from that elastomeric material and is therefore integral to the diaphram. A pressure differential $P_2-P_3$ is therefore present across the diaphram and will result in an upward force opposing a spring force exerted by a compressed coil spring 46 on diaphram 43 that is contained in spring casing 30. Force $P_2-P_3$ also opposes force $P_3-P_4$ which acts to hold the throttling element 44 against the throttling plae 33. A force balance situation therefor results which controls the position of the throttling element with respect to the throttling plate that in turn controls the amount of open area through the flowgrid regulator. With the flowgrid regulator open, flow travels from upstream to an interstage chamber 36 above the throttling plate to downstream. The resulting increase in flow into the downstream system will increase the pressure $P_4$ in that downstream system. As $P_4$ increases the pilot regulator 24 will close resulting in a decrease in flow through the pilot system and fixed orifice 28. That decrease in flow results in an increase in loading pressure $P_3$, and with the increase in $P_3$, the pressure differential $P_2-P_3$ is reduced, the force exerted by coil spring 46 and the increase in pressure differential $P_3-P_4$, then forces the throttling element 44 against the throttling plate 33 reducing the flow area, and results in a reduction in flow through the device. If the requirement for the flow is reduced to zero then pilot regulator 24 closes. Pressure will then equalize across fixed orifice 28 and loading pressure $P_3$ will equal inlet pressure $P_1$. When inlet pressure $P_1$ equals loading pressure $P_3$ the throttling element 44 will close completely against throttling plate 33, with the load from coil spring 46 in combination with the pressure differential $P_3-P_4$ forcing the throttling element against the throttling plate resulting in tight shutoff.

The above functional description of a pilot system 23 and its interaction with the flowgrid regulator 20, of the present invention, has included a brief synopsis of the functioning of the major components of the flowgrid regulator. These components are described in detail later herein with respect to FIG. 3, and were provided to outline one functional arrangement of the present invention. It should be understood, however, that the flowgrid regulator can be used with other types of pilot systems functioning to selectively provide a fluid flow therethrough. The described pilot system is, of course, a basic pneumatic or hydraulic amplifier arrangement and such systems preferably provide a built in flexibility in that the opening limits of the pilot regulator, that is the variable orifice, can be adjusted and even the fixed orifice can be varied by substituting one fixed orifice for another to achieve a desired functional relationship. In practice, the fixed orifice will be smaller in diameter than the variable orifice to function as described. Such pilot or variable orifice can be constructed to respond to pressure changes, or to changes in flow, temperature, or on/off signals.

Figure 2:
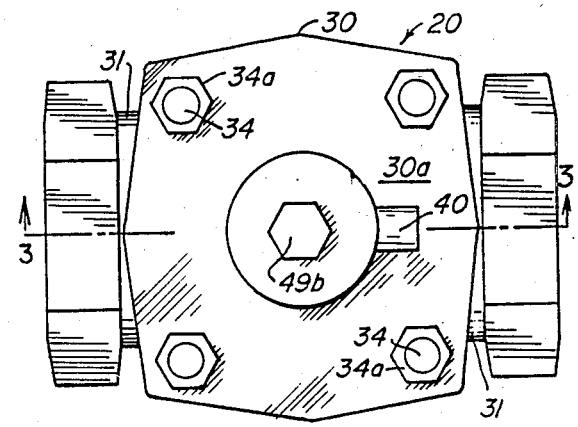
FIG. 2 is a top plan view of the flowgrid regulator of FIG. 1 shown removed from the system.

FIG. 2 shows a top plan view of the flowgrid regulator 20 of the present invention removed from line 21 and the pilot system 23 of FIG. 1. Shown therein the spring casing 30 is flanged outwardly at its base 30a into a square shape the corners thereof having holes formed therethrough to receive bolts that secure it to a valve body 31 sandwiching, in stacked relationship as shown in sectional view of FIG. 3, throttling plate 33 and a spacer 32 therebetween. As shown in FIGS. 2 and 3, the assembly is maintained together by turning of nuts 34a over ends of bolts in 34 that fit, as shown in broken lines in FIG. 3, through the spring casing base 30a corners to extend below a flange formed in the valve body outside of the coupling to line 21 such that the head 34b of each bolt is accessible from outside the flowgrid regulator.

Figure 4:
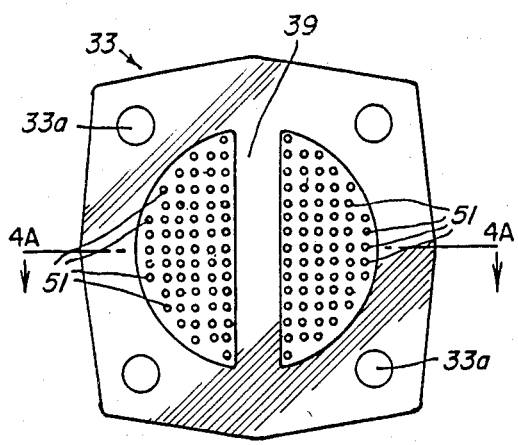
FIG. 4 is a top plan view of an embodiment of a throttling plate removed from the flowgrid regulator of FIG. 3.
Figure 4A:
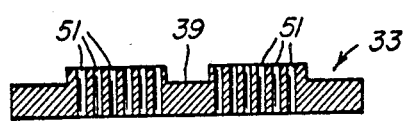
FIG. 4A is a sectional view taken along the line 4A—4A of FIG. 4.

The flowgrid regulator of FIG. 3, proceeding from top to bottom, includes the spring casing 30 that contains a chamber identified as loading chamber 35. Pressure admitted from line 22 through inlet port 40, $P_3$ acts therein upon diaphram 43. A pressure $P_2$, the pressure present in an interstage chamber 36 located below the diaphram 43 and above the throttling plate 33 acts on the diaphram from the opposite direction. A pressure differential $P_2-P_3$, is thereby provided across the diaphram. The valve body includes a barrier 37 that is curved upwardly from each side thereof so to direct the flow from line 21, at a ninety degree upward angle to the flow line, the barrier terminating in an edge 38 that fits snuggly against, in sealing engagement with, a closed or solid center portion 39 of throttling plate 33. That, as shown in FIG. 4A may be relieved to control the area of the sealing surface. So arranged, the pressure in the loading chamber 35 will be that pressure provided by the pilot system, loading pressure $P_3$, and the pressure in interstage chamber 36 will be identified as pressure $P_2$, with each pressure acting on opposite surfaces of the diaphram 43. Pressure $P_4$ in the flowgrid regulator outlet also creates a force on diaphram 43.

Flowgrid regulator 20 functioning, as set out above, is provided by vertical or peeling movement of a diaphram 43 within cavity 41 above the throttling plate. The height of cavity 41 is an arrangement of shoulder 42 and is preferably such that the diaphram 43 can travel a distance of approximately 20% of the internal diameter of spacer 32 with a contact of a disc 47 on the end of a loading coil spring 46 against an open edge of shoulder 42 stopping further vertical diaphram travel. The diaphram is constructed to withstand flexure damage by design of the shape of the elastomeric material and appropriate selection of high tensile strength fabric reinforcement, which elastomeric material is arranged beneath the spring casing base 30a across the loading chamber 35 interior, and maintained at its edges that are sandwiched between that base and the spacer 32. The spring casing base 30a, diaphram spacer 32, the throtting plate 33 and the flanged portion of valve body 31 all have holes formed through corners thereof that align to receive bolts 34 fitted therethrough for clamping the components together when nuts 34a are turned therover. Sealing of the components together, at the corners, is preferably provided by a utilization of appropriate gaskets or O-rings arranged at component junctions prior to their being clamped together. So assembled, the diaphram 43 is free to flex vertically within the cavity 41, flexing at its junction between the spring casing base 30a undersurface and spacer 32 between the cavity shoulder 42 and where the throttling element 44 engages the throttling plate 33. In practice, a fabric reinforced elastomeric material manufactured by Bellofram Corporation identified as a nitrile/polyester or Buna N/polyester has been found to provide a material having the desired characteristics of flexure and high tensile strength for covering diaphram 43 and forming throttling element 44.

Figure 5:
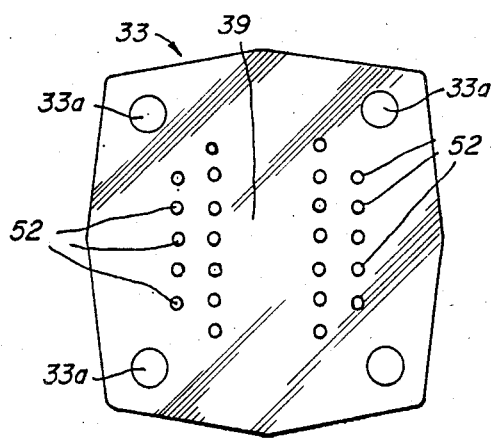
FIG. 5 is another embodiment of a throttling plate.

FIG. 3 shows, a throttling element 44 bonded to the undersurface of diaphram 43 that is aligned to cover over openings 45 formed through throttling plate 33. The arrangement of which openings 45 are shown as preferably mirror images of one another across solid center portion 39 thereof and will be discussed in detail later herein with respect to FIGS. 4, 5, 6. It should, however, be understood that a flow pattern with non-semetrical openings may alternatively be selected and the area surrounding the openings may be relieved as illustrated in FIG. 4A. The preferred throttling element is one made of the same elastomeric material that coats the diaphram though it should be understood that the throttling element could be formed separately from the diaphram and bonded thereto within the scope of this disclosure. And where nitrile has proven satisfactory in practice for both diaphram coating and formation of the throttling element, it should be understood that any elastomer capable of flexure such that the throttling element will uniformly lift or peel off of the throttling plate openings as described, that will close tightly in sealing engagement over said holes but will not to extrude into those throttling plate holes or openings, would be satisfactory. In practice, a solid throttling element 44, as described, has been used, and in another embodiment, a throttling element that incorporates parallel spaced ribs molded or implanted into the throttling element, across the flow path has also been utilized. Such a rib throttling plate is shown in FIGS. 7, 9 and 10 and will be explained in detail later herein.

The above described diaphram 43 that includes the throttling element 44 provides for closing off openings 45 formed through the throttling plate 33. Such closure is responsive to the described pressure differential in conjunction with a spring loading biasing. The preferred spring as shown best in FIG. 3, is in this embodiment is coil spring 46 that is supported within the spring casing, positioned within the loading chamber 35 between disc 47 that, rests on the surface of diaphram 43 opposite to throttling element 44, and a plate 48, that is secured across a spring upper end. Plate 48 vertical positioning within the loading chamber translates to spring compressive loading and is adjusted by turning of an adjusting screw 49 that is turned through a top end 30a of the spring casing 30, to move an end 49a against that plate 48 and contact of disc 47 with the opening through chamber shoulder 42 limiting vertical travel of the coil spring 46 and diaphram 43. The screw preferably includes a head 49b for a fitting a tool thereto for turning that adjusting screw 49 to appropriately compress or expand the spring, providing an adjustment capability to the loading force exerted by the coil spring 46 against diaphram disc 47. Diaphram loading is therefore a resultant of the pressure differential $P_2-P_3$, the loading force exerted by coil spring 46, and the pressure differential $P_2-P_4$. The position of the throttling element 44 relative to the throttling plate 33 is therefore governed by the combination of the coil spring force in conjunction with the pressure differentials. Pressure $P_3$ could be generated otherwise than with pilot system 23, as shown in FIG. 1, as from an independent source, not shown, either liquid or gaseous, provided that such pressure source is equal to or greater than the inlet fluid pressure $P_1$. Additionally, while a coil spring 46 has been shown and described herein as preferred, it should be understood that any spring arrangement could be so used within the scope of this disclosure and in other embodiments of FIGS. 9 and 10, a different spring configuration is shown that will be described in detail latter herein.

Figure 6:
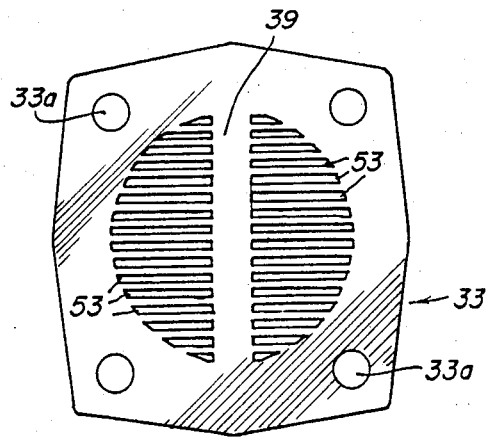
FIG. 6 is still another embodiment of a throttling plate.

As set out above, the flowgrid regulator of the present invention provides for a selection of a throttling plate to achieve certain flow characteristics. FIGS. 4, 4a, 5 and 6 show three different embodiments of throttling plates 33 that each including a center closed area 39 that, as set out above, aligns with the flat edge end 38 of barrier 37. The throttling plate includes, on either side of the closed area 39 complimentary groups of openings therethrough that are mirror images of one another, although other non simetrical arrangements are also possible within the scope of this disclosure. FIG. 4 shows as openings small holes 51 wherethrough the flow will be divided into smaller flows resulting in control of the damaging effects of cavitation which occurs at high pressure drops and in FIG. 4A the area surrounding holes 51 can, like area 39, also be relieved. Whereas, in FIG. 5 the image openings 52 are shown to be larger diameter holes that are spaced relatively far apart. This arrangement provides a reduction in flow capacity as compared to the throttling plate of FIGS. 4 and 4A and a throttling plate of 6. In FIG. 6 is shown a throttling plate that is arranged to provide a high capacity flow therethrough, by an arrangement of longitudinal openings 53 formed therethrough in the line of flow, which openings have a greater open area as compared to either of the throttling plates of FIGS. 4 and 5.

Hereinabove, are set out three different embodiments of throttling plates for providing a different flow capacities and characteristics therethrough with arms around those openings appropriately relieved as shown in FIG. 4A to control the area of seal engagement. It should be understood however, that a number of configurations of openings, that are preferrably but not necessarily mirror images, across a center closed or solid area, could be employed within the scope of this disclosure.

FIG. 7 shows a top plan view of another diaphram 55 with a throttling element 56 secured or integral thereto, which arrangement is essentially like the diaphram 43 and throttling element 44 shown and described hereinabove with respect to FIG. 3. Except, however, the throttling element 56 of this embodiment is shown to include ribs 57 embedded or implanted therein so as to lie parallel and spaced apart with one another and extending laterally across a flow path. The ribs are preferably straight small diameter sections of steel rod, heavy wire, or the like and are preferably implanted therein during the molding process forming the diaphram. This arrangement of ribs is shown also in the profile sectional view of another embodiment of the flowgrid regulator that is shown in FIG. 9. The ribs 57 are shown therein as spaced equally apart and essentially co-planar through a horizontal center of that throttling element. As with the earlier described throttling element, 44, a pressure differential will cause the throttling element 56 to lift off the throttling plate, the ribs providing lateral reinforcement and allowing for a smooth rolling or peeling action of the throttling element lifting off from the throttling plate. Where, the throttling element 44 of the embodiment of FIG. 3 must be sufficiently stiff to avoid being extruded into the holes or openings in that throttling plate, the throttling element 56 of FIG. 7, need not be formed of as stiff a material, the ribbing providing both a reinforcing and a bonding of that material to discourage extrusion through the throttling plate openings or holes. As with the earlier diaphram 43 and the described throttling plates, the diaphram 55 includes holes 55a formed through the corners thereof for alignment and receipt of bolts 34 installed therethrough to sandwich, in sealing engagement, the diaphram between a spacer and throttling plate.

In FIG. 8 is shown another arrangement of a valve body 58 of the flowgrid regulator. This valve body includes a right angle section 59 that redirects a flow through the flowgrid regulator at a right angle thereto. Except for the right angle section 59 the flowgrid regulator FIG. 8 is like that shown and described with respect to FIG. 3, and therefore that portion has been broken away.

FIG. 9 shows another embodiment of a flowgrid regulator 60 that is essentially like flowgrid regulator 20 of FIG. 3 except that it utilizes another embodiment of a spring casing and loading spring therewith. It should be understood that either of the described diaphrams, throttling elements therefore, and throttling plates could be used as components of the flowgrid regulator 60 of FIG. 9. Therefor, for illustration, the diaphram 55 of FIG. 7 that includes throttling element 56 with ribs 57 implanted is shown included with this flowgrid regulator 60. Where as discussed, the flowgrid regulator 20 of the FIG. 3 employs an elongate spring casing 30 for housing the coil spring 46, spring casing 62 of this embodiment is essentially flat to accomodate, an embodiment of an elliptical spring 61 therein. The elliptical spring 61 is an arrangement of two bowed leaf springs 63a and 63b that are joined at their ends 64 by pivot couplings. In this embodiment, the lower bowed leaf spring 63b is bent or flexed directly against the diaphram upper surface, opposite to the throttling element bonded therebelow. The elliptical spring 61 provides a centered application of force against the diaphram that urges the throttling element into covering engagement with throttling plate and functioning of this throttling element is similar to the functioning of throttling element 44 of FIG. 3.

In FIG. 10 is shown another embodiment of an elliptical spring 70 that like elliptical spring 61 is an arrangement to a pair of upper and lower leaf springs 71a and 71b connected at their ends, preferably by pivot couplings 72. Additionally, elliptical spring 70 includes a third leaf 73 centrally secured, as by rivets 74, or the like to lower leaf spring 71b, the leafs bowed oppositely from their center coupling. Additionally, the third leaf 73 ends are preferably bowed at 75 oppositely to the center bow providing points of contact for engaging the diaphram upper surface above points on opposite sides of the throttling element and in the line of the flow. In this embodiment thereby, the spring loading is transmitted to the throttling element ends concentrating the spring loading force at the points where the throttling element will first lift off the throttling plate.

In the embodiment of FIG. 9, with the elliptical spring 61 shown therewith or the elliptical spring 70 of the embodiment of FIG. 10, the spring force generated by the elliptical spring arrangement is governed by the height of cavity 62a. As with the embodiment of FIG. 3, flowgrid regulator 60 of FIG. 9 is assemblied by fitting bolts, as shown in broken lines, through openings therethrough and turning nuts thereover. Flowgrid regulator 60 also includes an inlet port 65 that, like the inlet port 40 of the embodiment of FIG. 3, is for connection to a pilot system. By providing a flatter loading chamber and elliptical spring arrangement, as described, the flowgrid regulator 60 will exhibit greater dynamic stiffness and stability. These characteristics are especially effective for controlling compressible fluids and, of course, the flowgrid regulator 60 will take up less space than its counterpart of FIG. 3.

FIG. 11 shows a combination of two throttling elements connected to opposite sides of a single valve body 66. The single valve body of this embodiment includes a barrier 67 that is like a mirror image of the barrier 38 of FIG. 3, opposite ends of that barrier intersecting the solid areas 69 of throttling plates 68. The throttling plates 68 are component parts of flowgrid regulators attached thereto that are preferably like the flowgrid regulator 20 of FIG. 3. Therefore, it should be understood the only material distinction between the arrangements of FIG. 3 and FIG. 11 is in the valve body 66 configuration with barrier 67 therein. The arrangement shown in FIG. 11 has a number of potential applications, as for example: both units can be controlled by the same pilot system providing thereby for an increased capacity. Alternately, separate pilots could be used to provide system redundancy, should it be desired, or to respond to different process variables such as flow, level or temperature.

The present invention in a flowgrid regulator has been shown and described to operate with a pilot system that is connected to provide a pressure within a spring casing that will be equal to or less than the inlet pressure to that flowgrid regulator to effect functioning. Therefore, it should be understood, that the present invention can be used with any independent pressure source connected to the pilot system so long as that pressure is equal to or greater than the inlet fluid pressure. Additionally, while several embodiments of throttling plates are shown and described herein, it should be understood that any number of different throttling plate configurations could be so used within the scope of this disclosure. And, while several embodiments of spring biasing arrangements have been shown and described, it should be understood that other spring arrangements would be appropriate for inclusion therewith. Also, while two embodiments of throttling elements have been shown and described herein, it should be understood that any throttling element, functioning as described, for arrangement with the flexing diaphram could be substituted for the described structure. And while a diaphram constructed of a elastomer reinforced with fabric forming also the throttling element, as manufactured by Bellofram Corporation identified as nitrile/polyester has been disclosed herein as preferred, other like materials may be used within the scope of this disclosure, providing that such arrangement results in a diaphram that is flexible but non stretchable.

Herein has been described a preferred arrangement of a flowgrid regulator and the components thereof. It should however be understood the present disclosure is made by way of example only and that changes can be made thereto without the departing from the subject matter coming within the scope of the following claims, which claims I regard as my invention.

I claim:

1. A bidirectional flowgrid regulator comprising, a valve body that includes a dividing barrier equally separating inlet and outlet flow passages; a throttling plate covering said flow passages and the dividing barrier, said throttling plate having openings therethrough that are holes or slots aligned with the direction of flow through said flow passages to receive fluid therefrom; a diaphram formed of a flexible non-stretchable material that includes a centrally fixed throttling element on one face thereof, said diaphram arranged to enable said throttling element to move into and out of sealing engagement over said openings in said throttling plate; a spring casing attached to said valve body by spring casing attachment means, said spring casing arranged over an upper surface of said diaphram opposite to said throttling element; leaf spring biasing means arranged in said spring casing for urging said throttling element of said diaphram into sealing engagement over said openings in said throttling plate, said leaf spring biasing means composed of a pair of first and second oppositely bowed elliptical spring leaves that face each other and are joined together at their ends to define an ellipse, said second leaf being located between said first leaf and said diaphram, with a third elliptical spring leaf located between said second leaf and said diaphram, said third elliptical leaf having a center portion and two free ends and is connected at said center portion to a center portion of said second leaf of said pair of leaves, each of said third leaf free ends is arranged to contact said upper surface of said diaphram at a location adjacent to an edge of said throttling element and on opposite sides of said dividing barrier; and an inlet means into said spring casing that provides communication between said spring casing and a source of pressurized fluid that provides loading pressure for urging said throttling element of said diaphram into sealing engagement against said throttling plate openings.

2. A flowgrid regulator as recited in claim 1, further including a spacer means for arrangement between the throttling plate means and the diaphram means.

3. A flowgrid regulator as recited in claim 1, wherein the valve body dividing barrier has a flat edge surface for engaging a solid center area of the throttling plate means; and the throttling plate means openings are on both sides of said solid center area.

4. A flowgrid regulator as recited in claim 1, wherein the non stretchable material of the diaphram is a fabric that is coated on both sides with an elastomer.

5. A flowgrid regulator as recited in claim 4, wherein the diaphram non stretchable material is nitrile/polyester manufactured by Bellofram Corporation.

6. A flowgrid regulator as recited in claim 1, wherein the throttling element of the diaphram means is integral thereto and is formed from the elastomeric material and dimensioned to fit over the throttling plate openings to provide a sealing engagement across said throttling plate openings.

7. A flowgrid regulator as recited in claim 6, further including spaced apart parallel ribs implanted centrally, at spaced apart intervals in the throttling element, said parallel ribs are co-planar and extend across and above the flow path through the throttling plate.

8. A flowgrid regulator as recited in claim 1, wherein the bowed leafs are pivotally coupled at their ends.

9. A flowgrid regulator as recited in claim 1, wherein the third leaf free ends are bent away from the diaphram means.

10. A flowgrid regulator as recited in claim 1, wherein the pressure source is provided by a pilot system that is responsive to a process variable to provide a loading pressure within the spring casing to operate the flowgrid regulator to pass a flow therethrough.

* * * * *